United States Patent
Qiu

(10) Patent No.: US 10,813,058 B2
(45) Date of Patent: Oct. 20, 2020

(54) METHOD FOR PROCESSING INFORMATION AND TERMINAL DEVICE

(71) Applicant: Guangdong Oppo Mobile Telecommunications Corp., Ltd., Dongguan, Guangdong (CN)

(72) Inventor: Lei Qiu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/439,072

(22) Filed: Jun. 12, 2019

(65) Prior Publication Data

US 2019/0297586 A1    Sep. 26, 2019

Related U.S. Application Data

(63) Continuation of application No. 16/311,052, filed as application No. PCT/CN2017/105100 on Sep. 30, 2017.

(30) Foreign Application Priority Data

Dec. 7, 2016  (CN) .......................... 2016 1 1118312

(51) Int. Cl.
*H04W 52/24* (2009.01)
*H04W 84/12* (2009.01)
(Continued)

(52) U.S. Cl.
CPC ......... *H04W 52/248* (2013.01); *H04W 48/14* (2013.01); *H04W 48/16* (2013.01);
(Continued)

(58) Field of Classification Search
CPC ............... H04W 52/248; H04W 88/02; H04W 72/0473; H04W 48/14; H04W 84/12
See application file for complete search history.

(56) References Cited

U.S. PATENT DOCUMENTS

| 8,526,368 B2 | 9/2013 | Finlow-Bates et al. |
| 9,521,614 B2 | 12/2016 | Estevez et al. |

(Continued)

FOREIGN PATENT DOCUMENTS

| CN | 101635970 A | 1/2010 |
| CN | 101741457 A | 6/2010 |

(Continued)

OTHER PUBLICATIONS

International search report issued in corresponding international application No. PCT/CN2017/105100 dated Jan. 3, 2018.

(Continued)

*Primary Examiner* — Ian N Moore
*Assistant Examiner* — Rushil Parimal Sampat

(57) ABSTRACT

A method for processing information is provided. The method includes the following. A wireless fidelity (Wi-Fi) scan operation is performed through a Wi-Fi scan module to obtain N feedback time lengths corresponding to N access points (APs). The first AP is any one of the N APs and N is an integer greater than one. In response to an access instruction for the second AP, first power for information transmission is determined according to a feedback time length corresponding to the second AP. The first power is equal to second power plus a first power variable, where the first power variable is greater than zero when the feedback time length corresponding to the second AP is within a preset time length range. An access request is transmitted to the second AP at the first power. A terminal device is also provided.

14 Claims, 4 Drawing Sheets

(51) Int. Cl.
  *H04W 48/16* (2009.01)
  *H04W 48/14* (2009.01)
  *H04W 72/04* (2009.01)
  *H04W 88/02* (2009.01)

(52) U.S. Cl.
  CPC ....... *H04W 52/24* (2013.01); *H04W 72/0473* (2013.01); *H04W 84/12* (2013.01); *H04W 88/02* (2013.01)

(56) References Cited

U.S. PATENT DOCUMENTS

| | | | |
|---|---|---|---|
| 9,538,330 B2 | 1/2017 | Gao, Jr. et al. | |
| 9,655,037 B2 * | 5/2017 | Stupar | H04W 48/14 |
| 9,661,561 B2 | 5/2017 | Shu | |
| 2015/0131435 A1 * | 5/2015 | Kasslin | H04W 84/12 370/230 |
| 2016/0135205 A1 | 5/2016 | Barbu et al. | |
| 2020/0059808 A1 * | 2/2020 | Lim | H04B 7/0626 |

FOREIGN PATENT DOCUMENTS

| | | | |
|---|---|---|---|
| CN | 102781115 A | 11/2012 | |
| CN | 102984708 A | 3/2013 | |
| CN | 103259618 A | 8/2013 | |
| CN | 103533614 A | 1/2014 | |
| CN | 104936255 A | 9/2015 | |
| CN | 105282823 A | 1/2016 | |
| CN | 106162828 A | 11/2016 | |
| EP | 2566058 A1 | 3/2013 | |
| EP | 2999268 A1 * | 3/2016 | ........... H04W 48/20 |
| EP | 2999268 A1 | 3/2016 | |
| KR | 20160036395 A | 4/2016 | |
| WO | 2013062586 A1 | 5/2013 | |

OTHER PUBLICATIONS

Extended European search report issued in corresponding European application No. 17878178.7 dated May 31, 2019.
First Examination Report issued in corresponding IN application No. 201917000452 dated Aug. 7, 2020.

* cited by examiner

METHOD FOR PROCESSING INFORMATION AND TERMINAL DEVICE

CROSS-REFERENCE TO RELATED APPLICATION(S)

This application is a continuation of U.S. application Ser. No. 16/311,052, filed on Dec. 18, 2018, which is a 371 of PCT Patent Application No. PCT/CN2017/105100 filed on Sep. 30, 2017, which claims priority of Chinese Patent Application No. 201611118312.8, filed on Dec. 7, 2016. The contents of the above applications are all incorporated by reference as if fully set forth herein in their entireties.

TECHNICAL FIELD

This disclosure relates to the technical field of electronics, and more particularly, to a method for processing information and a terminal device.

BACKGROUND

An important function of smart phones is capable of mobile interconnection. Wireless local area networks (WLANs), which provide free network services, are now used more and more frequently. When arriving at a strange place, many smart phone users first ask for passwords of the nearby wireless fidelity (Wi-Fi) hotspots.

At present, many public places are equipped with WLANs, especially public places with a large area serving a large number of people such as airports, high-speed rail stations, and the like. For example, in the Shenzhen airport, the service set identifier (SSID) of AirportSZ, namely a Wi-Fi hotspot, has nearly 150 access points (APs). However, users sometimes may not quickly connect to the SSID of AirportSZ. Therefore, how to improve the efficiency of accessing Wi-Fi hotspots is a technical problem to be solved in the field.

SUMMARY

Disclosed herein are implementations of a method for processing information and a terminal device, to improve the efficiency of accessing APs.

According to a first aspect of the implementations of the disclosure, a method for processing information is provided. The method includes the following. A Wi-Fi scan operation is performed through a Wi-Fi scan module to obtain N feedback time lengths corresponding to N APs. The feedback time length is a time length from a time point at which the terminal device transmits a probe frame to a first AP to a time point at which the terminal device receives a probe response fed back by the first AP according to the probe frame. The first AP is any one of the N APs and N is an integer greater than one. In response to an access instruction for a second AP, first power for information transmission is determined according to a feedback time length corresponding to the second AP. The first power is equal to a second power plus a first power variable. The first power variable is determined according to the feedback time length corresponding to the AP. The first power variable is greater than zero when the feedback time length corresponding to the second AP is within a preset time length range, and the second AP is one of the N APs. An access request is transmitted to the second AP at the first power.

According to a second aspect of the implementations of the disclosure, a terminal device is provided. The terminal device includes a scan module, a determining module, and a transmitting module. The scan module is configured to perform a Wi-Fi scan operation through a Wi-Fi scan module to obtain N feedback time lengths corresponding to N Aps. The feedback time length is a time length from a time point at which the terminal device transmits a probe frame to a first AP to a time point at which the terminal device receives a probe response fed back by the first AP according to the probe frame. The first AP is any one of the N APs, and N is an integer greater than one. The determining module is configured to determine first power for information transmission according to a feedback time length corresponding to a second AP in response to an access instruction for the second AP. The first power is equal to second power plus a first power variable and the first power variable is determined according to the feedback time length corresponding to the AP. The first power variable is greater than zero when the feedback time length corresponding to the second AP is within a preset time length range. The second AP is one of the N Aps. The transmitting module is configured to transmit an access request to the second AP at the first power.

According to a third aspect of the implementations of the disclosure, a terminal device is provided. The terminal device includes a memory storing executable program codes and a processor coupled with the memory. The processor is configured to invoke the executable program codes stored in the memory to perform the followings. A Wi-Fi scan operation is performed through a Wi-Fi scan module to obtain N feedback time lengths corresponding to N APs. The feedback time length is a time length from a time point at which the terminal device transmits a probe frame to a first AP to a time point at which the terminal device receives a probe response fed back by the first AP according to the probe frame. The first AP is any one of the N APs and N is an integer greater than one. In response to an access instruction for a second AP, first power for information transmission is determined according to a feedback time length corresponding to the second AP. The first power is equal to a second power plus a first power variable. The first power variable is determined according to the feedback time length corresponding to the AP. The first power variable is greater than zero when the feedback time length corresponding to the second AP is within a preset time length range, and the second AP is one of the N APs. An access request is transmitted to the second AP at the first power.

BRIEF DESCRIPTION OF DRAWINGS

To illustrate the technical solutions embodied by the implementations of the present disclosure more clearly, the following briefly introduces the accompanying drawings required for describing the implementations or the related art. Apparently, the accompanying drawings in the following description merely illustrate some implementations of the present disclosure. Those of ordinary skill in the art may also obtain other drawings based on these accompanying drawings without creative efforts.

DETAILED DESCRIPTION

Figure 1:
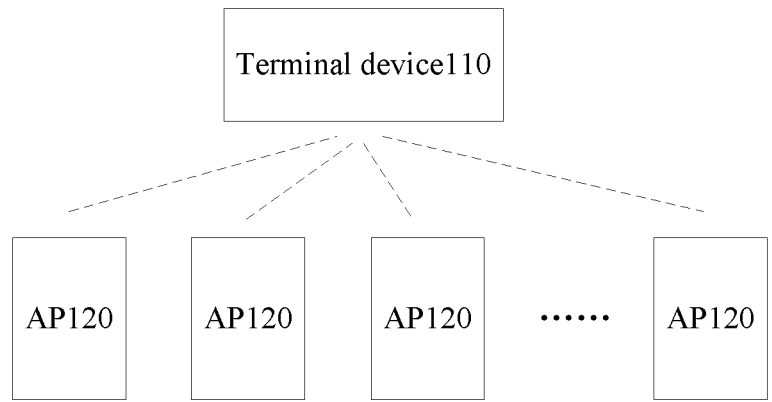
FIG. 1 is a schematic diagram of a communication system according to an implementation of the present disclosure.

In order to illustrate technical solutions of implementations of the present disclosure more clearly, technical solutions of implementations of the present disclosure will be described clearly and completely hereinafter in combination with the accompanying drawings described in the previous chapter. Obviously, the described implementations are merely a part of implementations of the present disclosure, but not all of the implementations. All other implementations obtained by those skilled in the art without creative efforts based on the implementations of the present disclosure shall fall within the protection scope of the present disclosure.

Detailed descriptions are as follows.

Terms "first", "second", "third", "fourth" and the like used in the specification, the claims, and the accompany drawings of the present disclosure are used to distinguish different objects rather than describe a particular order. In addition, the terms "include", "comprise", and "have" as well as variations thereof are intended to cover a non-exclusive inclusion. For example, a process, method, system, product, or apparatus including a series of steps or modules is not limited to the listed steps or modules. On the contrary, it can optionally include other steps or modules that are not listed; alternatively, other steps or modules inherent to the process, method, product, or device can be included either.

The term "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

Some of the terms in the present disclosure will be explained to be understood by those skilled in the art as follows.

"Terminal device", also called "user equipment (UE)", is a device that provides voice and/or data connectivity to a user, such as a handheld device with a wireless connection function, an in-vehicle device, and the like. The common terminal device, for example, may include a mobile phone, a tablet computer, a notebook computer, a handheld computer, a mobile internet device (MID), and a wearable device such as a smart watch, a smart bracelet, a pedometer, and the like.

"Multiple" or "a plurality of" means two or more. "and/or" describes the association relationship of the associated objects and indicates three relationships. For example, A and/or B indicates these three relationship of A existing separately, A and B existing at the same time, and B existing separately. The character "/" generally indicates that the contextual object is an "or" relationship.

FIG. 1 illustrates a schematic diagram of a communication system according to an implementation of the present disclosure. As illustrated in FIG. 1, the communication system includes a terminal device 110 and multiple APs 120. When the terminal device 110 scans for a Wi-Fi network, a probe frame is transmitted on a certain channel. After receiving the probe frame, the AP 120 around the terminal device 110 will transmit a probe response with a service set identifier (SSID) of a Wi-Fi hotspot corresponding to the AP. The terminal device then adds the SSID to a scan list. In addition, when the terminal device transmits the probe frame, a timer is started. When the terminal device receives the probe response transmitted by the AP, a feedback time length corresponding to the AP is recorded. In the final scan list, different APs correspond to different feedback time lengths. The longer the feedback time length is, the worse the connection state between the terminal device and the AP is. When an access instruction for the Wi-Fi hotspot in the scan list is detected later, the terminal device 110 first determines whether the feedback time length of the Wi-Fi hotspot is long. If the feedback time length of the Wi-Fi hotspot is long, power for information transmission of the terminal device 110 is increased, so as to improve the efficiency of accessing the Wi-Fi hotspot. The power for information transmission is power at which the terminal device transmits information to other devices, such as, power at which the terminal device transmits the access request to the AP.

Figure 2:
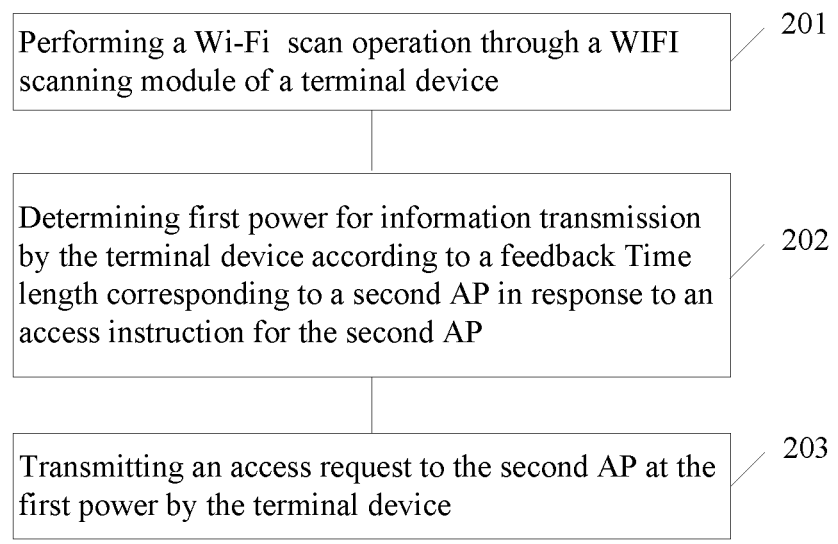
FIG. 2 is a schematic flow chart of a method for processing information according to an implementation of the present disclosure.

FIG. 2 illustrates a schematic flow chart of a method for processing information according to an implementation of the present disclosure. The method includes the following.

At block 201, a terminal device performs a Wi-Fi scan operation through a Wi-Fi scan module to obtain N feedback time lengths corresponding to N APs. The feedback time length is a time length from a time point at which the terminal device transmits a probe frame to a first AP to a time point at which the terminal device receives a probe response fed back by the first AP according to the probe frame. The first AP is any one of the N APs and N is an integer greater than one.

At block 202, when an access instruction for a second AP is detected, the terminal device determines first power for information transmission. The first power is equal to second power plus a first power variable. The first power variable is greater than zero when a feedback time length corresponding to the second AP is within a preset time length range, and the second AP is one of the N APs.

At block 203, the terminal device transmits an access request to the second AP at the first power.

The second power is a fixed value. For example, the connection rate of the information in the 2.4G is 1M and the corresponding power for transmission is 17 dBmm.

The preset time length range may be, for example, from 60 ms to 300 ms, or other values.

In one implementation, the first power variable may be determined according to the feedback time length corresponding to the AP. For example, the first power variable= (feedback time length—an intermediate node of the preset time length range+1)*X, where X is a positive integer. For example, if X=5 dBm, the feedback time length=100 ms=0.1 s, and the preset time length range=60 ms~300 ms=0.06 s~0.3 s, then the intermediate node of the preset time length range is 180 ms=0.18 s, so that the first power variable is 4.6 dBm.

Alternatively, the first power variable may be determined according to a mapping relationship between power variables and feedback time lengths and the feedback time length corresponding to the AP. For example, the mapping relationship between the power variables and the feedback time lengths can be as illustrated in Table 1. Assuming that the feedback time length corresponding to the AP is 100 ms, the first power variable is 4 dBm according to Table 1.

TABLE 1

| Feedback time length | Power variable |
|---|---|
| 40 ms~90 ms | 3 dBm |
| 91 ms~120 ms | 4 dBm |
| 121 ms~145 ms | 6 dBm |
| . | . |
| . | . |
| . | . |

In one implementation, different feedback time lengths within the preset time length range correspond to the same first power variable. Assuming that the preset time length range=60 ms~300 ms, the first power variable=3 dBm, the first feedback time length=80 ms, and the second feedback time length=100 ms, the first power variable corresponding to the first feedback time length and the first power variable corresponding to the second feedback time length both are 3 dBm.

For example, the power for transmission set by the terminal device is normally fixed power. The connection rate of the information in the 2.4G is 1M and the corresponding power for transmission is 17 dBmm. In a public place, the AP receives many connection requests. The connection request having the best signal quality and the lowest bit error rate may be accepted more easily. When scanning for the Wi-Fi network, the terminal device may transmit the probe frame on the certain channel. After receiving the probe frame, the AP around the terminal device will transmit the probe response with a SSID of a Wi-Fi hotspot and a MAC address of the AP corresponding to the SSID of the Wi-Fi hotspot. The terminal device then adds the SSID of the Wi-Fi hotspot and the MAC address of the AP corresponding to the SSID of the Wi-Fi hotspot to a scan list illustrated in Table 2 for example. In addition, when the terminal device transmits the probe frame, a timer is started. When the terminal device receives the probe response transmitted by the AP, the feedback time length of the Wi-Fi hotspot corresponding to the AP is recorded in the scan list. In the final scan list, different APs correspond to different feedback time lengths. The longer the feedback time length is, the poor connection state between the terminal device and the AP is. When detecting the access instruction for the Wi-Fi hotspot in the scan list later, the terminal device first determines whether the feedback time length of the Wi-Fi hotspot is long. If the feedback time length of the Wi-Fi hotspot is long, the power for information transmission of the terminal device is increased, so as to improve the efficiency of accessing the Wi-Fi hotspot.

TABLE 2

| SSID | MAC address | Feedback time length |
|---|---|---|
| A | $a_1$ | 60 ms |
| B | $b_1$ | 50 ms |
|  | $b_2$ | 65 ms |
|  | $b_3$ | 70 ms |
|  | . | . |

TABLE 2-continued

| SSID | MAC address | Feedback time length |
|---|---|---|
|  | . | . |
|  | . | . |
|  | $b_n$ | 100 ms |
| C | c | 50 ms |
|  | . | . |
|  | . | . |
|  | . | . |
| D | d | 100 ms |

In one implementation, the method further includes the following after the terminal device transmits the access request to the second AP at the first power.

In response to unsuccessful receipt of an access permit response fed back by the second AP according to the access request within predetermined time length, the power for information transmission is adjusted to be third power, and an access request is transmitted to the second AP at the third power. The third power is equal to the first power plus a second power variable, and the second power variable is greater than zero.

The predetermined time length for example may be 1 s, 2 s, 3 s, 6 s, 7 s, or other time lengths.

The second power variable is a fixed value, such as 3 dBm.

For example, it is assumed that the predetermined time length is 150 ms, the first power is 20 dBm, and the second power variable is 3 dBm. In response to unsuccessful receipt of an access permit response fed back by the second AP according to the access request within 150 ms, it indicates the adjusted power for information transmission is not enough. The power for information transmission is increased to 23 dBm by the terminal device to further improve the Wi-Fi access efficiency.

In one implementation, in response to that the feedback time length corresponding to the second AP is outside the preset time length range, the first power variable is equal to zero. That is, the feedback time length corresponding to the second AP is less than the lower limit of the preset time length range. In other words, when the feedback time length of the second AP is outside the preset time length, the communication connection state between the terminal device and the second AP is better. In this situation, it is not necessary to adjust the power for information transmission of the terminal device and the access request may be transmitted to the second AP at fixed power (i.e., the first power variable is equal to zero).

In one implementation, after transmitting the access request to the second AP, the method further includes the followings.

The terminal device receives the access permit response fed back by the second AP according to the access request, where the access permit response carries information of an IP address assigned to the terminal device by the second AP.

The terminal device connects to the second AP according to the IP address.

Figure 3:
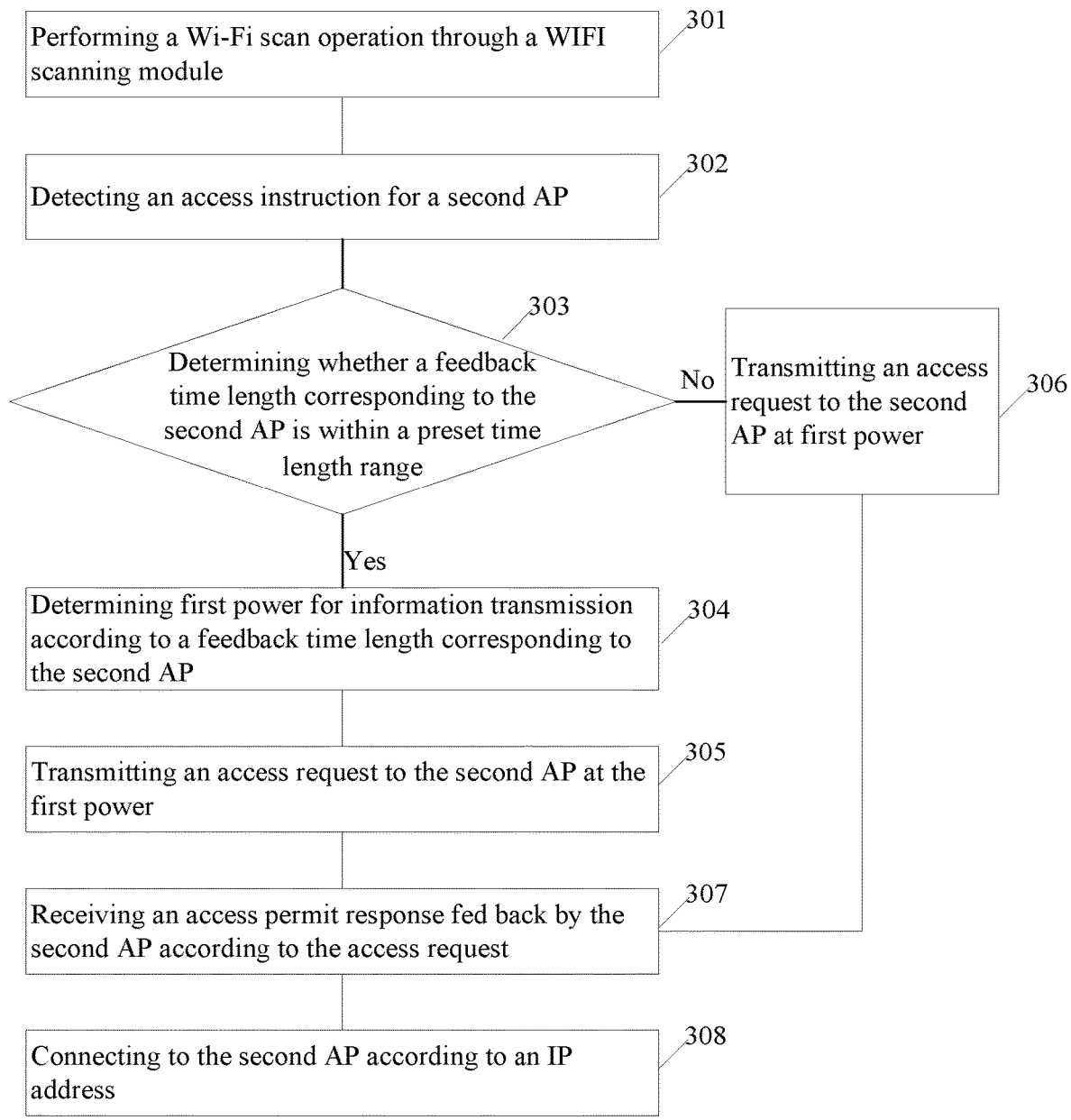
FIG. 3 is a detailed schematic flowchart of a method for processing information according to an implementation of the present disclosure.

FIG. 3 illustrates a detailed schematic flow chart of another method for processing information according to an implementation of the present disclosure. The method includes the following.

At block 301, a terminal device performs a Wi-Fi scan operation through a Wi-Fi scan module to obtain N feedback time lengths corresponding to N APs. The feedback time length is a time length from a time point at which the terminal device transmits a probe frame to a first AP to a time point at which the terminal device receives a probe response fed back by the first AP according to the probe frame. The first AP is any one of the N APs and N is an integer greater than one.

At block 302, the terminal device detects an access request corresponding to a second AP, where the second AP is one of the N APs.

At block 303, the terminal device determines whether a feedback time length corresponding to the second AP is within a preset time length range.

Based on a determination that the feedback time length corresponding to the second AP is within the preset time length range, operations at block 304 to block 305 are performed.

Based on a determination that the feedback time length corresponding to the second AP is not within the preset time length range, operations at block 306 are performed.

At block 304, the terminal device determines first power for information transmission according to the feedback time length corresponding to the second AP, the first power is equal to second power plus a first power variable, and the first power variable is greater than zero.

At block 305, the terminal device transmits the access request to the second AP at the first power. After operation at block 305 is performed, the method proceeds to operations at block 307.

At block 306, the terminal device transmits the access request to the second AP at the second power. After operation at block 306 is performed, the method proceeds to operations at blocks 307 to 308.

At block 307, the terminal device receives an access permit response fed back by the second AP according to the access request, where the access permit response carries an IP address assigned to the terminal device by the second AP.

At block 308, the terminal device connects to the second AP according to the IP address.

It is to be noted that the specific implementation of the method illustrated in FIG. 3 may refer to the specific implementation described in the foregoing method, which will not be described in further details herein.

Figure 4:
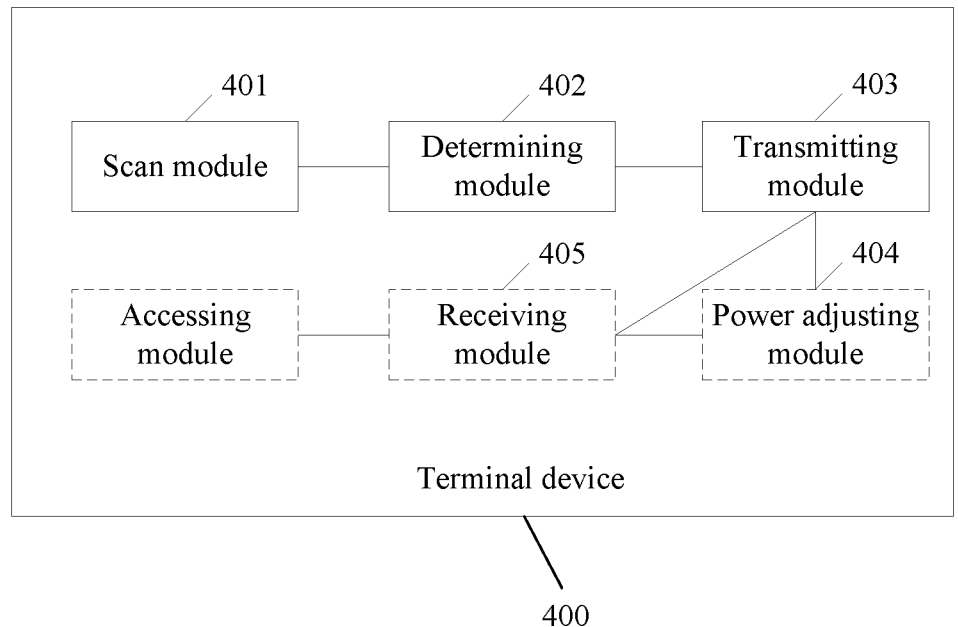
FIG. 4 is a schematic structural diagram of a terminal device according to an implementation of the present disclosure.

FIG. 4 illustrates a schematic block diagram of a terminal device according to an implementation of the present disclosure. The terminal device 400 includes a scan module, a determining module, and a transmitting module.

The scan module 401 is configured to perform a Wi-Fi scan operation through a Wi-Fi scan module to obtain N feedback time lengths corresponding to N APs. The feedback time length is a time length from a time point at which the terminal device transmits a probe frame to a first AP to a time point at which the terminal device receives a probe response fed back by the first AP according to the probe frame. The first AP is any one of the N APs and N is an integer greater than one.

The determination module 402 is configured to determine first power for information transmission according to a feedback time length corresponding to a second AP in response to an access instruction for the second AP. The first power is equal to second power plus a first power variable. The first power variable is greater than zero when a feedback time length corresponding to the second AP is within a preset time length range, and the second AP is one of the N APs.

The transmitting module 403 is configured to transmit an access request to the second AP at the first power.

In one implementation, the terminal device 400 further includes a power adjusting module.

The power adjustment module 404 is configured to adjust the power for information transmission to be third power In response to unsuccessful receipt of an access permit response fed back by the second AP according to the access request. The third power is equal to the first power plus a second power variable, and the second power variable is greater than zero.

The transmitting module 403 is further configured to transmit the access request to the second AP at the third power.

In one implementation, the second power variable is a fixed value.

In one implementation, in response to that the feedback time length corresponding to the second AP is outside the preset time length range, the first power variable is equal to zero.

In one implementation, the first power variable is determined according to the feedback time length corresponding to the AP.

In one implementation, the first power variable is determined according to a mapping relationship between power variables and feedback time lengths and the feedback time length corresponding to the AP.

In one implementation, the first power variable=(the feedback time length−an intermediate node of the preset time length range+1)*X, where the X is a positive integer.

In one implementation, different feedback time lengths within the preset time length range correspond to the same first power variable.

In one implementation, the terminal device further includes a receiving module 405 and an accessing module 406.

The receiving module 405 is configured to receive the access permit response fed back by the second AP according to the access request. The allowed access response carries information of an IP address assigned to the terminal device by the second AP.

The accessing module 406 is configured to connect to the second AP according to the IP address.

It is to be noted that the above modules (the scan module 401, the determining module 402, the transmitting module 403, the power adjusting module 404, the receiving module 405, and the accessing module 406) are used to perform the related operations in the above-described method.

In the present disclosure, the terminal device 400 is presented in the form of modules. The term "module" used herein may refer to an application-specific integrated circuit (ASIC), a processor capable of executing one or more software or firmware programs and a memory, an integrated logic circuit, and/or other suitable components capable of providing the above-described functions. In one implementation, the scan module 401, the determining module 402, power adjusting module 404, and accessing module 406 may be implemented by a processor 501 of a terminal device 500 illustrated in FIG. 5, and the transmitting module 403 and receiving module 405 may be implemented by a communication interface 503 of the terminal device as illustrated in FIG. 5.

Figure 5:
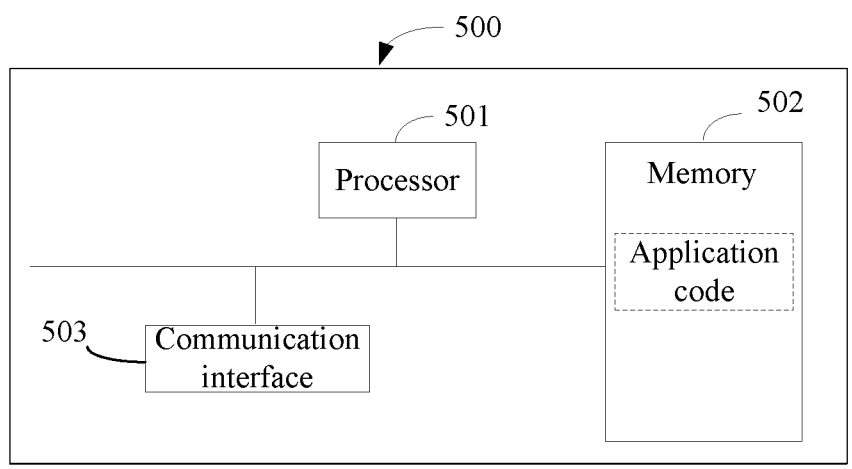
FIG. 5 is a schematic structural diagram of another terminal device according to an implementation of the present disclosure.

As illustrated in FIG. 5, the terminal device 500 may be implemented in the structure of FIG. 5. The terminal device 500 includes the processor 501, at least one memory 502, and the communication interface 503. The processor 501, the memory 502, and the communication interface 503 are coupled by a communication bus and communicate with each other.

The processor 501 may be a general-purpose central processing module (CPU), a microprocessor, an ASIC, or one or more integrated circuits for controlling execution of programs of the above schemes.

The communication interface 503 is configured to communicate with other devices or communication networks, such as an Ethernet, a radio access network (RAN), a wireless local area network (WLAN), and the like.

The memory 502 may be a read-only memory (ROM) or other types of static storage devices that may store static information and instructions, a random access memory (RAM) or other types of dynamic storage device that may store information and instructions. The memory 502 may also be an electrically erasable programmable read-only memory (EEPROM), a compact disc read-only memory (CD-ROM) or other compact disc storages, optical disc storage (including compact discs, laser discs, optical discs, digital versatile discs, Blu-ray discs, etc.), a magnetic disk storage medium or other magnetic storage devices. The disclosure is not limited thereto. The memory 502 can be separated from the processor 501 and be connected to the processor 501 via a bus. The memory 502 can also be integrated with the processor 501.

The memory 502 is configured to store application codes for executing the above scheme and is controlled by the processor 501 for execution. The processor 501 is configured to execute the application codes stored in the memory 502.

The application codes stored in the memory 502 can be executed by the terminal device for implementing the above method for processing information. For example, a Wi-Fi scan operation is performed through the Wi-Fi scan module to obtain the N feedback time lengths corresponding to the N APs, where the feedback time length is a time length from a time point at which the terminal device transmits a probe frame to a first AP to a time point at which the terminal device receives a probe response fed back by the first AP according to the probe frame, the first AP is any one of the N Aps, and N is an integer greater than 1. In response to the access instruction for the second AP, the first power for information transmission is determined according to the feedback time length corresponding to the second AP. The first power is equal to the second power plus the first power variable, the first power variable is greater than zero when the feedback time length corresponding to the second AP is within the preset time length range, and the second AP is one of the N APs. The access request is transmitted to the second AP at the first power.

In one implementation, the terminal device is a mobile phone 600. Components of the mobile phone 600 will be specifically described below in combination with the accompanying FIG. 6. The mobile phone 600 includes a processor 680, an RF circuit 610, a memory 620, an input module 620, a display module 640, an audio circuit 660, a speaker 661, a microphone 662, a Wi-Fi module 670, and a power supply 690.

The RF circuit 610 may be configured to receive and transmit signals during transmitting/receiving information or a call. After receiving downlink information of a base station, The RF circuit 610 may transmit the downlink information to the processor 680 to be processed. In general, the RF circuit 610 includes, but is not limited to, an antenna, at least one amplifier, a transceiver, a coupler, a low noise amplifier (LNA), a duplexer, and so on. In addition, the RF circuit 610 may also communicate with the network and other devices via wireless communication. The above wireless communication may use any communication standard or protocol, which includes but is not limited to global system of mobile communication (GSM), general packet radio service (GPRS), code division multiple access (CDMA), Wideband code division multiple access (WCDMA), long term evolution (LTE), E-mail, short messaging service (SMS), and so on.

The memory 620 may be configured to store software programs and modules. The processor 680 may be configured to execute various function applications and data processing of the mobile phone 600 by running software programs and the modules stored in the memory 620. The memory 620 may mainly include a program storage area and a data storage area. The program storage area may store an operating system, an application program required for at least one function (such as a Wi-Fi scanning function, an information transmission/reception function, a power adjusting function), and the like. The data storage area can store data (such as the first power, the third power, and the IP address assigned by the second AP to the terminal device) created according to the use of the mobile phone 600, and the like. Moreover, memory 620 can include high-speed random access memory, and can also include non-volatile memory such as at least one magnetic disk storage device, flash memory device, or other volatile solid state storage device.

The input module 630 may be configured to receive input digital or character information and generate key signal input associated with user setting and function control of the mobile phone 600. As one implementation, the input module 630 may include a touch panel 631 and other input devices 632. The touch panel 631, also referred to as a touch screen, is configured to collect touch operations performed by a user thereon or nearby the touch panel 631 (such as operations performed by the user using any suitable object or accessory such as a finger, a stylus, or the like to touch the touch panel 631 or areas near the touch panel 631), and to drive a corresponding connecting device according to a preset program. In one implementation, the touch panel 631 can include two parts, that is, a touch detection device and a touch controller. The touch detection device is configured to detect the touch orientation of the user and a signal brought by the touch operation, and to transmit the signal to the touch controller. The touch controller is configured to receive the touch information from the touch detection device, to convert the touch information into contact coordinates to be sent to the processor 680, and to receive and execute commands from the processor 680. In addition, the touch panel 631 can be implemented in various types such as a resistive touch panel, a capacitive touch panel, an infrared touch panel, and a surface acoustic wave touch panel. In addition to the touch panel 631, the input module 630 may further include other input devices 632. The other input devices 632 may include, but are not limited to, one or more of a physical keyboard, a function key (such as a volume control button, a switch button, and so on), a trackball, a mouse, a joystick, and the like.

The display module 640 is configured to display information input by the user, information provided for the user, or various menus of the mobile phone 600. The display module 640 can include a display panel 641. In one implementation, the display panel 641 can be configured in the form of a liquid crystal display (LCD), an organic light-emitting diode (OLED), and so on. Furthermore, the touch panel 631 can cover the display panel 641. When the touch panel 631 detects a touch operation thereon or nearby, the touch panel 931 transmits the touch operation to the processor 680 to determine a type of the touch event, and then the processor 680 provides a corresponding visual output on display panel 641 according to the type of the touch event.

Figure 6:
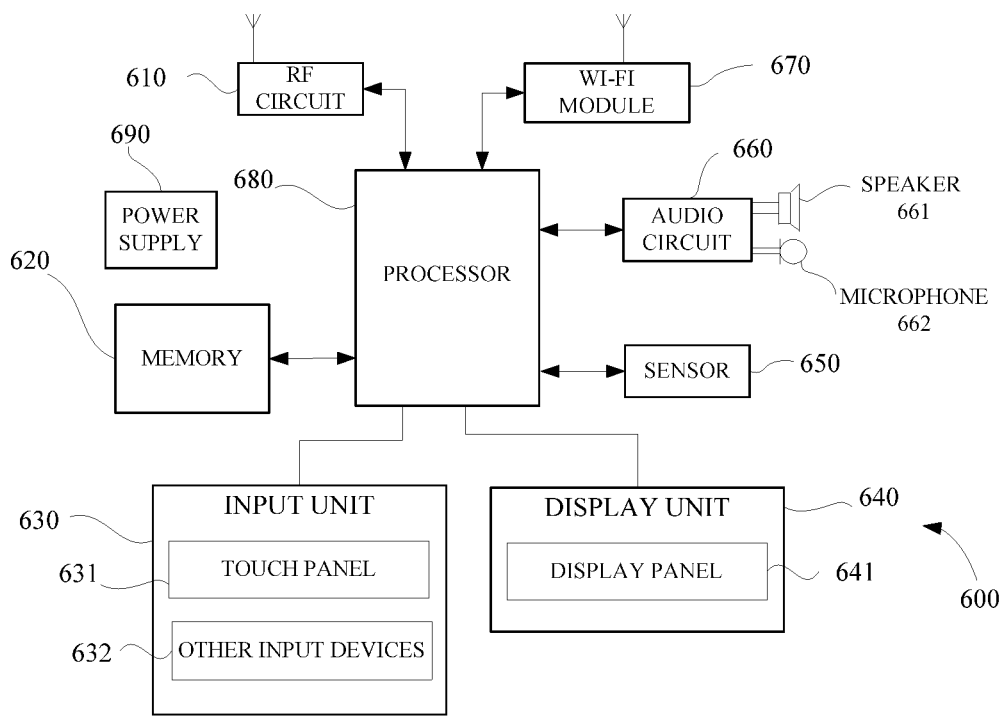
FIG. 6 is a schematic structural diagram of a yet another terminal device according to an implementation of the present disclosure.

Although in FIG. 6, the touch panel 631 and the display panel 641 function as two independent components to implement input and output functions of the mobile phone 600, in some implementations, the touch panel 631 may be integrated with the display panel 641 to implement the input and output functions of the phone.

The mobile phone 600 may also include at least one sensor 650, such as a light sensor, a motion sensor, and other sensors. In one implementation, the light sensor may include an ambient light sensor and a proximity sensor. The ambient light sensor may adjust the luminance of the display panel 641 according to the luminance of the ambient light, and the proximity sensor may turn off the display panel 641 and/or backlight when the mobile phone 600 reaches nearby the ear. As a kind of motion sensor, the accelerometer sensor can detect magnitude of acceleration in all direction (usually three axes), and when the mobile phone 600 is stationary, the accelerometer sensor can detect the magnitude and direction of gravity. The accelerometer sensor can also be configured for applications related to identification of mobile-phone gestures (such as vertical and horizontal screen switch), or can be used for vibration-recognition related functions (such as a pedometer, percussion), and so on. The mobile phone 600 can also be equipped with other sensors, such as a gyroscope, a barometer, a hygrometer, a thermometer, an infrared sensor, and so on, and details are not described herein again.

The audio circuit 660, the speaker 661, and the microphone 662 may provide audio interfaces between the user and the mobile phone 600. The audio circuit 660 can convert the received audio data into an electrical signal and transmit the electrical signal to the speaker 661, and then the speaker 661 may convert the electrical signal to a sound signal to output. On the other hand, the microphone 662 may convert the collected sound signal into an electrical signal, which will be received and converted to audio data by the audio circuit 660 to output to the processor 680. The audio data is then processed by the processor 680 and transmitted via the RF circuit 610 to another mobile phone. Alternatively, the audio data may be output to the memory 620 for further processing.

Wi-Fi belongs to a short-range wireless transmission technology. With aid of the Wi-Fi module 670, the mobile phone 600 can help users send and receive e-mail, browse the web, access streaming media, and so on, which provides the users with wireless broadband Internet access. Although the Wi-Fi module 670 is illustrated in FIG. 6, however, it should be understood that the Wi-Fi module 670 is not a necessary component of a mobile phone, and can be completely omitted as needed without changing the essence of the disclosure.

The processor 680 is a control center for the mobile phone 600. The processor 680 connects various parts of the entire mobile phone 600 through various interfaces and lines. By running or executing software programs and/or modules stored in the memory 620 and calling data stored in the memory 620, the processor 680 can execute various functions of the mobile phone 600 and conduct data processing, so as to monitor the mobile phone 600 as a whole that uses various interfaces and lines to connect various components of the mobile phone 600, performs various functions and processes data of the mobile phone 600 by running or executing software programs and/or modules stored in the memory 620, and invoking data stored in the memory 620, thereby overall monitoring the mobile phone 600. In one implementation, the processor 680 can include at least one processing module. In one implementation, the processor 680 can be integrated with an application processor and a modem processor, where the application processor is mainly configured to handle an operating system, a user interface, applications, and so on and the modem processor is mainly configured to deal with wireless communication. It will be appreciated that the modem processor mentioned above may not be integrated into the processor 680.

The mobile phone 600 further includes a power supply 690 (such as a battery) for powering various components. In one implementation, the power supply can be logically connected to the processor 680 via a power management system, to manage charging, discharging, power management functions, and so on through the power management system.

Although not illustrated, the mobile phone 600 may further include a camera, a Bluetooth module, and so on, and details are not described herein again.

In the foregoing implementations, each operation of the method may be implemented based on the structure of the mobile phone 600 in FIG. 6.

An implementation of the present disclosure further provides a computer-readable storage medium. The computer-readable storage medium is configured to store computer programs. The computer programs may perform some or all of the operations of any one of the methods for processing information as described in the above method implementations.

It should be noted that, for the foregoing method implementations, for a brief description, all of the method implementations are described as a series of operation combinations. However, those skilled in the art should understand that the present disclosure is not limited by the described sequence of operations, as certain steps may be performed in other sequences or concurrently according to the present disclosure. Besides, those skilled in the art should also know that the implementations described in the specification are exemplary implementations, and the actions and modules involved are not necessarily required by the present disclosure.

In the foregoing implementations, the description of each implementation has its own emphasis. For the parts not described in detail in one implementation, reference may be made to related descriptions in other implementations.

In the implementations provided in the present disclosure, it should be understood that, the device disclosed may be implemented in other ways. For example, the device implementations described above are merely illustrative. For instance, the division of the module is only a logical function division and there can be another way of division during actual implementations. For example, multiple modules or components may be combined or may be integrated into another system, or some features may be ignored or not performed. In addition, coupling or communication connection between each illustrated or discussed component may be direct coupling or communication connection, or may be indirect coupling or communication among devices or modules via some interfaces, and may be electrical connection, mechanical connection, or other forms of connection.

The modules described as separate components may or may not be physically separated, the components illustrated as modules may or may not be physical modules, and namely they may be in the same place or may be distributed to multiple network modules. Part or all of the modules may be selected according to actual needs to achieve the purpose of the technical solutions of the implementations.

In addition, the functional modules in various implementations of the present disclosure may be integrated in one processing module, or each module may be physically present, or two or more modules may be integrated in one module. The above-mentioned integrated module may be implemented in the form of hardware or a software function module.

The integrated modules may be stored in a computer-readable storage medium, when the integrated modules are implemented in the form of software functional modules and sold or used as an independent product. Based on this understanding, the technical solution of the present disclosure essentially, or the part contributing to the related art, or all or part of the technical solution may be implemented in the form of a software product. The computer software product is stored in a storage medium, and includes several instructions for causing a computer device (which may be a personal computer, a server, a network device, and so on) to execute some or all of the steps of the method according to each implementation of the present disclosure. The foregoing storage medium includes various media capable of storing program codes, such as a universal serial bus (USB), flash disk, a ROM, a RAM, a removable hard disk, a magnetic disk, an optical disk, and so on.

The implementations of the present disclosure are described in detail above, specific examples are used herein to describe the principle and implementation manners of the present disclosure. The description of the above implementations is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. A method for processing information, comprising:
    performing a wireless fidelity (Wi-Fi) scan operation through a Wi-Fi scan module to obtain N feedback time lengths corresponding to N access points (APs) around a terminal device, and adding N service set identifiers (SSIDs) corresponding to the N APs and N feedback time lengths corresponding to the N APs to a scan list, wherein each of the N feedback time lengths is a time length from a time point at which the terminal device transmits a probe frame to a first AP to a time point at which the terminal device receives a probe response fed back by the first AP according to the probe frame, the first AP is any one of the N APs, and N is an integer greater than one;
    determining whether a feedback time length corresponding to a second AP in the scan list is within a preset time range when an access instruction for the second AP is detected, wherein the second AP is one of the N APs; and enabling the terminal device to quickly connect to the second AP via determining first power for the terminal device transmitting information to the second AP to be equal to second power plus a first power variable according to the feedback time length corresponding to the second AP, wherein the first power variable is determined according to the feedback time length corresponding to the second AP, the first power variable is greater than zero when the feedback time length corresponding to the second AP is within a preset time length range;
    transmitting an access request to the second AP at the first power;
    adjusting power for the terminal transmitting information to the second AP to be third power in response to unsuccessful receipt of an access permit response fed back by the second AP according to the access request within predetermined time length, and transmitting the access request to the second AP at the third power, wherein the third power is equal to the first power plus a second power variable, and the second power variable is greater than zero;
    receiving the access permit response fed back by the second AP according to the access request, wherein the access permit response carries information of an internet protocol (IP) address assigned to the terminal device by the second AP; and
    connecting to the second AP according to the IP address.

2. The method of claim 1, wherein the first power variable is equal to zero in response to that the feedback time length corresponding to the second AP is outside the preset time length range.

3. The method of claim 1, wherein the first power variable is equal to zero in response to that the feedback time length corresponding to the second AP is outside the preset time length range.

4. The method of claim 1, further comprising the following after the transmitting the access request to the second AP at the first power:
    receiving the access permit response fed back by the second AP according to the access request, wherein the access permit response carries information of an internet protocol (IP) address assigned to the terminal device by the second AP; and
    connecting to the second AP according to the IP address.

5. A terminal device, comprising:
    a scan module, being configured to perform a Wi-Fi scan operation through a Wi-Fi scan module to obtain N feedback time lengths corresponding to N APs around a terminal device, and add N service set identifiers (SSIDs) corresponding to the N APs and N feedback time lengths corresponding to the N APs to a scan list, wherein each of the N feedback time lengths is a time length from a time point at which the terminal device transmits a probe frame to a first AP to a time point at which the terminal device receives a probe response fed back by the first AP according to the probe frame, the first AP is any one of the N APs, and N is an integer greater than one;
    a determining module, being configured to determine whether the feedback time length corresponding to a second AP in the scan list is within a preset time range when an access instruction for the second AP is detected, wherein the second AP is one of the N APs, and enable the terminal device to quickly connect to the second AP via determining first power for the terminal device transmitting information to a second AP to be equal to second power plus a first power variable according to the feedback time length corresponding to the second AP, wherein the first power variable is determined according to the feedback time length corresponding to the second AP, the first power variable is greater than zero when the feedback time length corresponding to the second AP is within a preset time length range;
    a transmitting module, being configured to transmit an access request to the second AP at the first power;
    a power adjusting module, being configured to adjust power for the terminal device transmitting information to the second AP to be third power in response to unsuccessful receipt of an access permit response fed back by the second AP according to the access request within a predetermined time length, wherein the third power is equal to the first power plus a second power variable, and the second power variable is greater than zero;

a receiving module, being configured to receive the access permit response fed back by the second AP according to the access request, wherein the access permit response carries information of an IP address assigned to the terminal device by the second AP; and an accessing module, being configured to connect to the second AP according to the IP address;

the transmitting module being further configured to transmit the access request to the second AP at the third power.

6. The terminal device of claim 5, wherein the first power variable is equal to zero in response to that the feedback time length corresponding to the second AP is outside the preset time length range.

7. The terminal device of claim 5, wherein the first power variable is equal to zero in response to that the feedback time length corresponding to the second AP is outside the preset time length range.

8. The terminal device of claim 5, further comprising:

a receiving module, being configured to receive the access permit response fed back by the second AP according to the access request, wherein the access permit response carries information of an IP address assigned to the terminal device by the second AP; and an accessing module, being configured to connect to the second AP according to the IP address.

9. A terminal device, comprising:

a memory storing executable program codes; and a processor coupled with the memory;

the processor being configured to invoke the executable program codes stored in the memory to execute the followings:

performing a wireless fidelity (Wi-Fi) scan operation through a Wi-Fi scan module to obtain N feedback time lengths corresponding to N access points (APs) around a terminal device, and adding N service set identifiers (SSIDs) corresponding to the N APs and N feedback time lengths corresponding to the N APs to a scan list, wherein each of the N feedback time lengths is a time length from a time point at which a terminal device transmits a probe frame to a first AP to a time point at which the terminal device receives a probe response fed back by the first AP according to the probe frame, the first AP is any one of the N APs, and N is an integer greater than one;

determining whether a feedback time length corresponding to a second AP in the scan list is within a preset time range when an access instruction for the second AP is detected, wherein the second AP is one of the N APs; and enabling the terminal device to quickly connect to the second AP via determining first power for the terminal device transmitting information to a second AP to be equal to second power plus a first power variable according to the feedback time length corresponding to the second AP, wherein the first power variable is determined according to the feedback time length corresponding to the second AP, the first power variable is greater than zero when the feedback time length corresponding to the second AP is within a preset time length range;

transmitting an access request to the second AP at the first power;

adjusting power for the terminal device transmitting information to the second AP to be third power in response to unsuccessful receipt of an access permit response fed back by the second AP according to the access request within predetermined time length, and transmitting the access request to the second AP at the third power, wherein the third power is equal to the first power plus a second power variable, and the second power variable is greater than zero;

receiving the access permit response fed back by the second AP according to the access request, wherein the access permit response carries information of an internet protocol (IP) address assigned to the terminal device by the second AP; and connecting to the second AP according to the IP address.

10. The terminal device of claim 9, wherein the first power variable is equal to zero in response to that the feedback time length corresponding to the second AP is outside the preset time length range.

11. The terminal device of claim 9, wherein the first power variable is equal to zero in response to that the feedback time length corresponding to the second AP is outside the preset time length range.

12. The terminal device of claim 9, the processor is further configured to invoke the executable program codes stored in the memory to execute the followings after the transmitting the access request to the second AP at the first power:

receiving the access permit response fed back by the second AP according to the access request, wherein the access permit response carries information of an internet protocol (IP) address assigned to the terminal device by the second AP; and connecting to the second AP according to the IP address.

13. The method of claim 1, wherein the first power variable=(feedback time length−an intermediate node of the preset time length range+1)*X, where X is a positive integer.

14. The method of claim 1, wherein the first power variable is determined according to a mapping relationship between power variables and the feedback time length corresponding to the AP.

* * * * *